United States Patent
Sirohi

(10) Patent No.: US 9,235,723 B2
(45) Date of Patent: Jan. 12, 2016

(54) SYSTEMS AND METHODS FOR CONTEXT-SENSITIVE DATA SECURITY FOR BUSINESS APPLICATION PERFORMANCE OPTIMIZATION

(71) Applicant: Oracle International Corporation, Redwood Shores, CA (US)

(72) Inventor: Arjun K Sirohi, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 64 days.

(21) Appl. No.: 13/944,529

(22) Filed: Jul. 17, 2013

(65) Prior Publication Data

US 2014/0304824 A1     Oct. 9, 2014

Related U.S. Application Data

(60) Provisional application No. 61/808,705, filed on Apr. 5, 2013.

(51) Int. Cl.
  *G06F 7/04* (2006.01)
  *G06F 21/62* (2013.01)

(52) U.S. Cl.
  CPC ........ *G06F 21/6218* (2013.01); *G06F 21/6227* (2013.01)

(58) Field of Classification Search
  None
  See application file for complete search history.

(56) References Cited

U.S. PATENT DOCUMENTS

| | | | | |
|---|---|---|---|---|
| 8,983,990 | B2 * | 3/2015 | Duan et al. | 707/759 |
| 2004/0215626 | A1 * | 10/2004 | Colossi et al. | 707/100 |
| 2006/0101001 | A1 * | 5/2006 | Lindsay et al. | 707/3 |
| 2006/0235840 | A1 * | 10/2006 | Manikutty et al. | 707/4 |
| 2008/0091633 | A1 * | 4/2008 | Rappaport et al. | 706/50 |
| 2013/0006965 | A1 * | 1/2013 | Barbas | 707/718 |

OTHER PUBLICATIONS

National Institute of Standards and Technology (NIST), Role Based Access Control-Rrequently Asked Questions, ND, 4 pages. Retrieved from: http://csrc.nist.gov/groups/SNS/rbac/faq.html accessed on the World Wide Web Jan. 2013.

Sandhu, et al., American National Standard for Information Technology—Role Based Access Control, ANSI INCITS 359-2004, Feb. 3, 2004, 55 pages.

Unkown Author, Role-Based Access Control, retrieved on Jun. 10, 2013 from: http://en.wikipedia.org/wiki/Role-based_access_control, 4 pages.

Unknown Author, Oracle® Fusion Applications Security Guide 11g Release 1 (11.1.4), ND, 8 pages. Retrieved from: http://docs.oracle.com/cd/E28271_01/fusionapps.1111/e16689/F323388AN16D1F.htm.

(Continued)

*Primary Examiner* — Kaveh Abrishamkar
(74) *Attorney, Agent, or Firm* — Tucker Ellis LLP

(57) ABSTRACT

Described herein are systems and methods for providing context-sensitive data security, for business application performance optimization. In accordance with an embodiment, the system can be used together with a Role Based Access Control model. Data security predicates can be made context-sensitive, by taking into account the context in which an end-user is navigating an application. By providing context-sensitive data security in this manner, the complexity of database queries can be reduced, and the underlying relational database management system can create better-optimized execution plans.

17 Claims, 14 Drawing Sheets

(56) References Cited

OTHER PUBLICATIONS

Unknown Author, Context Awareness, retrieved on Jun. 10, 2013 from: http://en.wikipedia.org/wiki/Context_awareness, 4 pages.
Rosemann, et al., Context-Aware Process Design: Exploring the Extrinsic Drivers for Process Flexibility, 2006, pp. 149-158.
Kaltz, et al., Context-Aware Web Engineering: Modeling and Applications, 2005, pp. 439-458.
Schilit, et al., Context-Aware Computing Applications, 1994, pp. 85-90.
Unknown Author, Oracle Fusion CRM Application, retrieved on Jun. 10, 2013 from: http://www.oracle.com/us/products/applications/fusion/customer-relationship-management/index.html, 8 pages.
Unknown Author, Oracle Application Development Framework, retrieved on Jun. 10, 2013 from http://www.oracle.com/technetwork/developer-tools/adf/overview/index.html, 2 pages.

* cited by examiner

```
SELECT <required columns>
FROM <required tables/views>
WHERE
<Joins>
AND
<Main Query Predicates>
AND
(DSP_Sub-Query-1
OR
DSP_Sub-Query-2
OR
DSP_Sub-Query-3
OR
...
DSP_Sub-Query-n )
AND
<Business Flow Use Case sub-query>
```

```
Start Generate Context-Sensitive DSP Sub-Query
   Get captured UI Context Attributes
   Retrieve RBAC Data Security Predicates Sub Queries for User
   Iterate Until all UI Context Attributes Processed
      Iterate Until all DSP Sub-Queries Processed
      Validate DSP Sub-Query Applicability
      If DSP Sub-Query Applicable to Current Context
         Then Keep DSP Sub-Query
         Else Remove DSP Sub-Query
      End if
      Validate Context-Attribute Applicability for Kept DSP Sub-Query
      If Attribute Applicable
         Apply Context Attribute to DSP Sub-Query
      End if
      End Iterate
   End Iterate
Dispatch Context-Sensitive DSP Sub-Queries for Being Applied to Main
SQL
End Generate Context-Sensitive DSP Sub-Query
```

```
SELECT
MklLeadEO.LEAD_NAME,
<Column names>
FROM
MKL_LM_LEADS MklLeadEO,
<Other table names>
WHERE
<Joins and predicates>
/* Main Filtering Criteria in Outer SQL that defines My Leads*/
AND ( ( ( (MklLeadEO.OWNER_ID = :BindLoggedInUserResourceId ) ) )
/* The secondary restrictive filter predicates CREATION_DATE */
AND ((MklLeadEO.CREATION_DATE BETWEEN :BindLowerDateRange AND
:BindUpperDateRange ) ) ) )
AND (:SysEffectiveDateBindVar BETWEEN
OrganizationDEO.EFFECTIVE_START_DATE(+) AND
OrganizationDEO.EFFECTIVE_END_DATE(+))
AND (OrganizationDEO.EFFECTIVE_LATEST_CHANGE(+) = 'Y')
/* Union of All OR'ed DSP Sub-Queries Appended by RBAC Security
Framework at runtime */
AND
( MklLeadEO.lead_id IN DSP-SubQuery1
OR MklLeadEO.lead_id IN DSP-SubQuery2
OR MklLeadEO.lead_id IN DSP-SubQuery3
OR MklLeadEO.lead_id IN DSP-SubQuery4
OR MklLeadEO.lead_id IN DSP-SubQuery5
OR MklLeadEO.lead_id IN DSP-SubQuery6
OR MklLeadEO.lead_id IN DSP-SubQuery7
OR MklLeadEO.lead_id IN DSP-SubQuery8
OR MklLeadEO.lead_id IN DSP-SubQuery9)
```

```
SELECT
MklLeadEO.LEAD_NAME,
<Column names>
FROM
MKL_LM_LEADS MklLeadEO,
<Other table names>
WHERE
<Joins and predicates>
(:SysEffectiveDateBindVar BETWEEN
OrganizationDEO.EFFECTIVE_START_DATE(+) AND
OrganizationDEO.EFFECTIVE_END_DATE(+))
AND (OrganizationDEO.EFFECTIVE_LATEST_CHANGE(+) = 'Y')
AND (MklLeadEO.lead_id IN
(SELECT lead_id
FROM MKL_LM_LEADS
WHERE owner_id =
(SELECT HZ_SESSION_UTIL.GET_USER_PARTYID FROM dual )
AND CREATION_DATE BETWEEN :BindLowerDateRange AND :BindUpperDateRange
)
```

SYSTEMS AND METHODS FOR CONTEXT-SENSITIVE DATA SECURITY FOR BUSINESS APPLICATION PERFORMANCE OPTIMIZATION

CLAIM OF PRIORITY

This application claims the benefit of priority to U.S. Provisional Patent Application titled "SYSTEMS AND METHODS FOR CONTEXT-SENSITIVE DATA SECURITY FOR BUSINESS APPLICATION PERFORMANCE OPTIMIZATION", Application No. 61/808,705, filed Apr. 5, 2013; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data security, and are particularly related to systems and methods for providing context-sensitive data security for business application performance optimization.

BACKGROUND

The importance of data security in enterprise business applications has risen sharply in recent years, particularly in view of newer regulations regarding data privacy, and the increased popularity of cloud-based environments. Controlling who has access to a particular set of data in a business application environment is a key concern while implementing security in such environments.

One of the common means of controlling data access is Role Based Access Control (RBAC), which has become a de facto industry standard, and which has been adopted and implemented by many business application vendors.

However, although there has been much research directed to the implementation and security benefits of RBAC, there has been less research on the impacts of such a data security model on the performance and scalability of business applications. Many commercial business applications use a relational database at the back-end, with processing of data managed through structured query language (SQL) queries. The performance of such SQL queries often dictates the performance and scalability of the application, among other factors.

SUMMARY

Described herein are systems and methods for providing context-sensitive data security, for business application performance optimization. In accordance with an embodiment, the system can be used together with a Role Based Access Control model. Data security predicates can be made context-sensitive, by taking into account the context in which an end-user is navigating an application. By providing context-sensitive data security in this manner, the complexity of database queries can be reduced, and the underlying relational database management system can create better-optimized execution plans.

BRIEF DESCRIPTION OF THE FIGURES

FIG. 3 illustrates a generic form of a database query generated at run-time using data security predicates.

FIG. 10 illustrates an example of how a context-processor can be implemented using a generic algorithm, in accordance with an embodiment.

FIG. 13 illustrates an example of a "My Leads" query prior to or without context processing.

FIG. 14 illustrates an example of context-sensitive "My Leads" query after context processing, in accordance with an embodiment.

DETAILED DESCRIPTION

As described above, the importance of data security in business applications has risen sharply in recent years, particularly in view of newer regulations regarding data privacy, and the increased popularity of cloud-based environments. Controlling who has access to a particular set of data in a business application environment is a key concern while implementing security in such environments.

Described herein are systems and methods for providing context-sensitive data security, for business application performance optimization. In accordance with an embodiment, the system can be used together with a Role Based Access Control (RBAC) model. Data security predicates (DSP) can be made context-sensitive, by taking into account the context in which an end-user is navigating an application. By providing context-sensitive data security in this manner, the complexity of database queries can be reduced, and the underlying relational database management system can create better-optimized execution plans.

Introduction

As described above, although there has been much research directed to the implementation and security benefits of RBAC, there has been less research on the impacts of such a data security model on the performance and scalability of business applications. Many commercial business applications use a relational database at the back-end, with processing of data managed through structured query language (SQL) queries. The performance of such SQL queries often dictates the performance and scalability of the application, among other factors.

Some contemporary approaches to data security use RBAC together with DSPs, in the form of SQL language WHERE clauses, to access data in the database. However, such approaches typically rely on several DSP sub-queries being OR-ed together and appended to a main SQL query, which negatively affects database query performance.

Additionally, although RBAC-based data security may not have huge performance impacts when each user has only a single defined role, performance degradations start to arise when users have multiple roles in an enterprise, and have access to data via many different DSP sub-queries.

For example, a sales manager using a Customer Relationship Management (CRM) application could have multiple roles, and implicit roles, through group memberships and hierarchy. Based on these roles, the sales manager's access to data would be controlled by a union of all the DSPs, which may sometimes overlap.

Such performance problems are further exacerbated by the fact that modern business applications typically have a very complex data model, with the data stored in many different database tables. Accessing such data even without DSPs often results in complex SQL queries, the performance of which is a challenge by itself. Appending of RBAC-based DSPs to complex dynamically generated SQL queries often results in poor performance at the database.

Data Security Predicates

Figure 1:
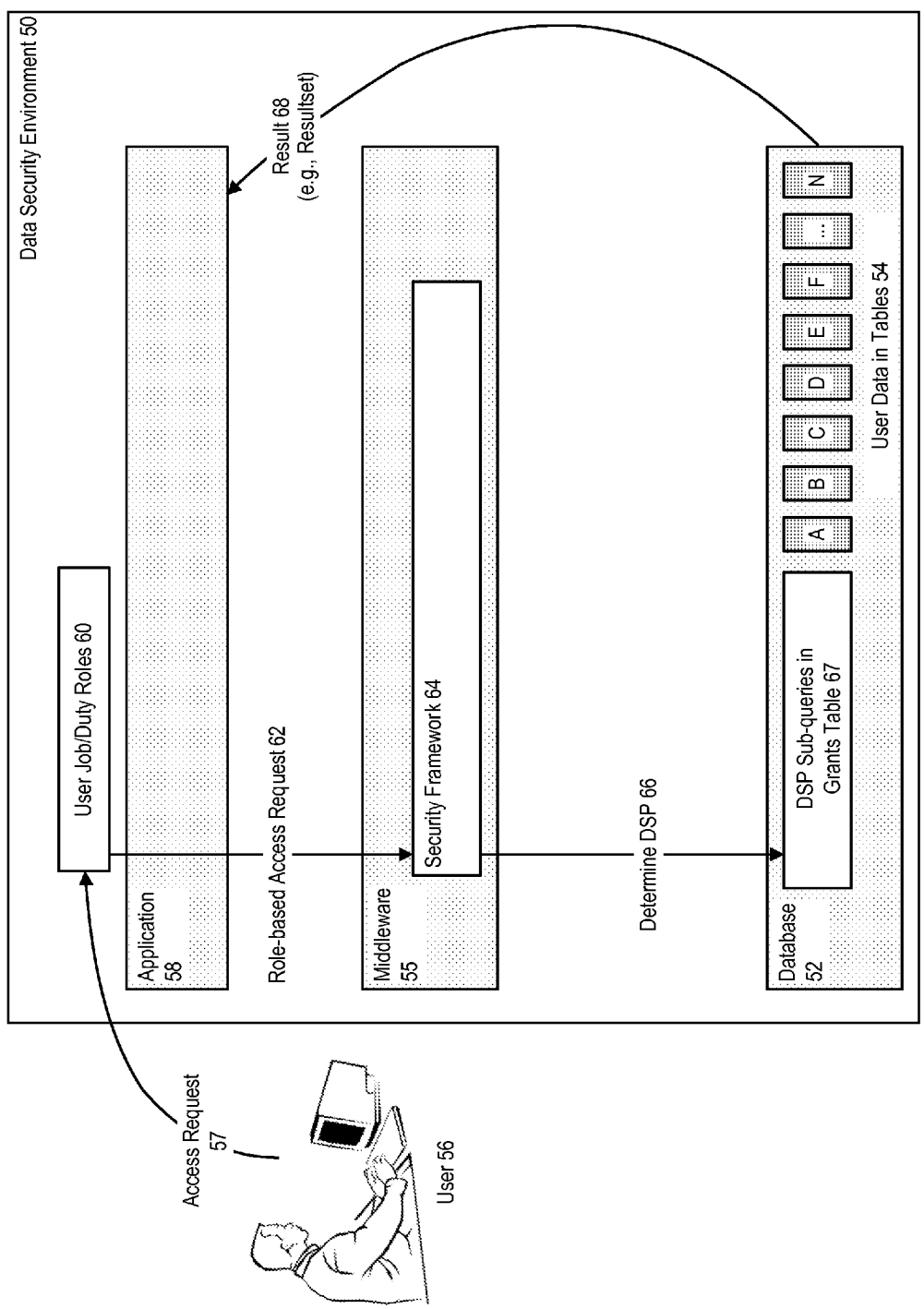
FIG. 1 illustrates an environment which can be used to provide access to a relational database management system using data security predicates.

FIG. 1 illustrates an environment which can be used to provide access to a relational database management system using data security predicates.

As shown in FIG. 1, in some business application environments, such as a typical Oracle Fusion Applications environment, data visibility is controlled through RBAC. Users are granted one or more roles and, when a user has multiple roles, RBAC ensures that the user's access is the union of all granted roles.

For example, as shown in FIG. 1, in a typical data security environment 50 that includes a database 52 with user data stored in tables 54, and a middleware 55, a user 56 can make an access request 57 to a business application 58, for example to query or update information in the database as part of a business flow. Typically, the user is associated with one or more defined job or duty roles 60. The role-based access request 62 is received by a security framework 64 at the middleware, which determines 66 appropriate DSPs stored in a central grants table in the database. The middleware security framework then uses this information to select DSP sub-queries to be OR'ed together 67, and appended to a main SQL query, which is/are then processed against the database to generate a result 68 (e.g., a resultset).

Figure 2:
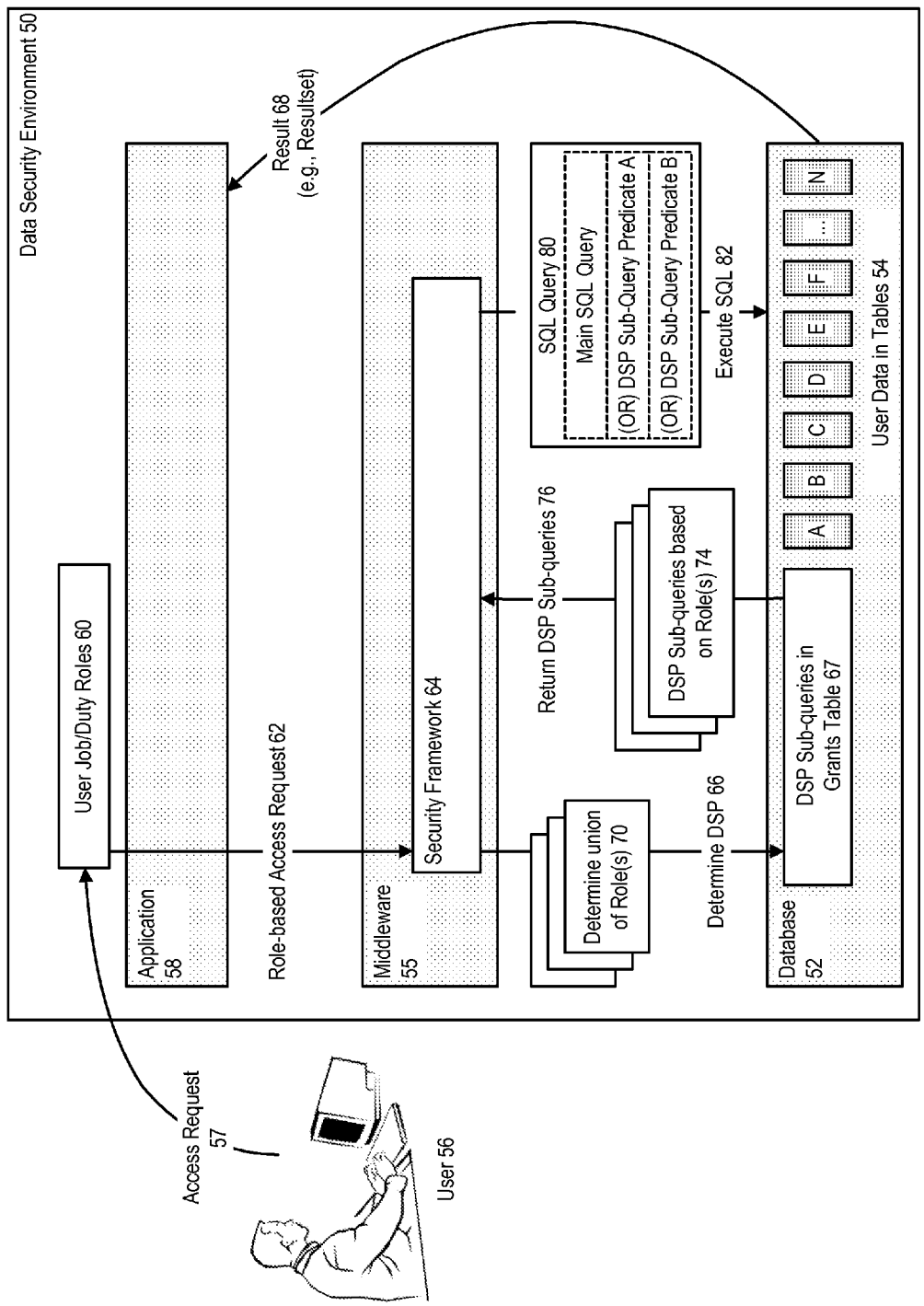
FIG. 2 further illustrates an environment that can provide access to a database using data security predicates.

FIG. 2 further illustrates an environment that can be used to provide access to a database using data security predicates. As shown in FIG. 2, the security framework ensures that, at run-time, any required instance sets are put together based on the grants for the defined job and duty roles. For example, at run-time, when a user logs into the application, and begins to use business flows which require SQL queries to be sent to the back-end database, the union of that user's roles is determined 70, and all of the user's accessible DSP sub-queries are provided 74, 76 to the security framework, and are then OR-ed together and appended to the main SQL query 80. The resultant (i.e., main plus the OR'ed DSPs) query is then communicated 82 to the database for execution. If a user defines an additional search criteria, this can be appended as an IN or EXISTS sub-query to the main SQL query.

FIG. 3 illustrates a generic form of a database query 90 generated at run-time using data security predicates, illustrating how multiple DSP sub-queries (in this example, DSP_Sub-Query-1, DSP_Sub-Query-2, etc.) are OR-ed together and appended to a main SQL query, to provide a resultant query for execution against the database.

However, the implementation of RBAC through the use of OR'ed DSP sub-queries as described above can result in poor system performance. For example, when a relational database cost-based optimizer (CBO) is used, the CBO may be unable to find an optimal execution plan based on the use case scenario being executed. A problem is that the DSP sub-queries may be written in many different forms—for example, some using EXISTS, some using IN, some using a combination of EXISTS and IN, and others using UNION or Nested-Sub-Queries. The problem is further compounded by the fact that the DSP sub-queries may reference a wide range of different, e.g., tables, or views, including hierarchical ones that make these sub-queries extremely complex. Given the SQLs' complexity and size, with many EXISTS and OR'ed DSP sub-queries, the CBO often has trouble handling the complex transformations and costing of such SQLs, and this has a considerable impact on their performance.

In many situations, the application and security framework does not make any allowance for the context in which the user is executing the SQL. For example, when a logged-in user switches context in their application to view his/her marketing leads, the SQL generated by the framework at run-time may append all of the OR'ed data security predicates to the SQL that the user's job/duty role has access to, based on the RBAC model that a user's data visibility is controlled by the union of all grants. It may not matter that the user was looking to find only the data for leads in which he/she was the owner, as controlled by owner_id column, and that this column was already the main filtering predicate in the main SQL query, making the evaluation of all the DSP sub-queries redundant. As a result, the CBO would need to evaluate (and typically materialize) all of the rows that the user was entitled to see, only to discard many later in the execution plan, and keep only the rows that the user wanted to view.

Additionally, for many use cases, the use-case sub-query appended dynamically to the SQL at run-time, has an equivalent DSP sub-query. This reflects the fact that the rows that qualify using the business flow search sub-query are essentially a sub-set of the rows that qualify from the UNION of all the OR'ed DSP sub-queries of the RBAC framework; and indicates that the DSP sub-queries may be logically redundant in many use cases. In business applications that use RBAC DSP sub-queries to control data visibility, the underlying relational database's CBO faces a dilemma—the so-called "Tiny-Huge, Huge-Tiny" problem in which to decide whether to drive from the main outer query, or drive from the RBAC-based DSP sub-queries, based on an estimate of which one will be more restrictive in terms of the number of qualifying rows. There are many factors that can influence the CBO's decision and the performance of dynamically generated SQL queries, which makes this a difficult estimation.

Context-Sensitive Data Security

In accordance with an embodiment, described herein are systems and methods for providing context-sensitive data security, for business application performance optimization.

As used herein, the term "context-sensitive" is generally used instead of "context-aware", to describe aspects of a business application user's context that have a direct bearing on the performance of SQLs and thereby on applications that use RBAC. As such, a context-sensitive RBAC architecture is not only context-aware, but can also make use of such context awareness to take certain actions that may significantly improve the performance of the SQL queries, and as a result improve the performance and scalability of the application.

In accordance with an embodiment, given the many factors affecting performance of SQLs that get appended with multi-role RBAC-based DSP sub-queries, the system enables making the data security context-sensitive at run-time. The system can achieve this by using context information to filter the row-set that would result from the union of all the DSP sub-queries, such as simplifying the SQL being sent to the database for execution; and by restricting the row-set processing to what the user wishes to retrieve, thereby removing inefficiencies in the execution process.

Figure 4:
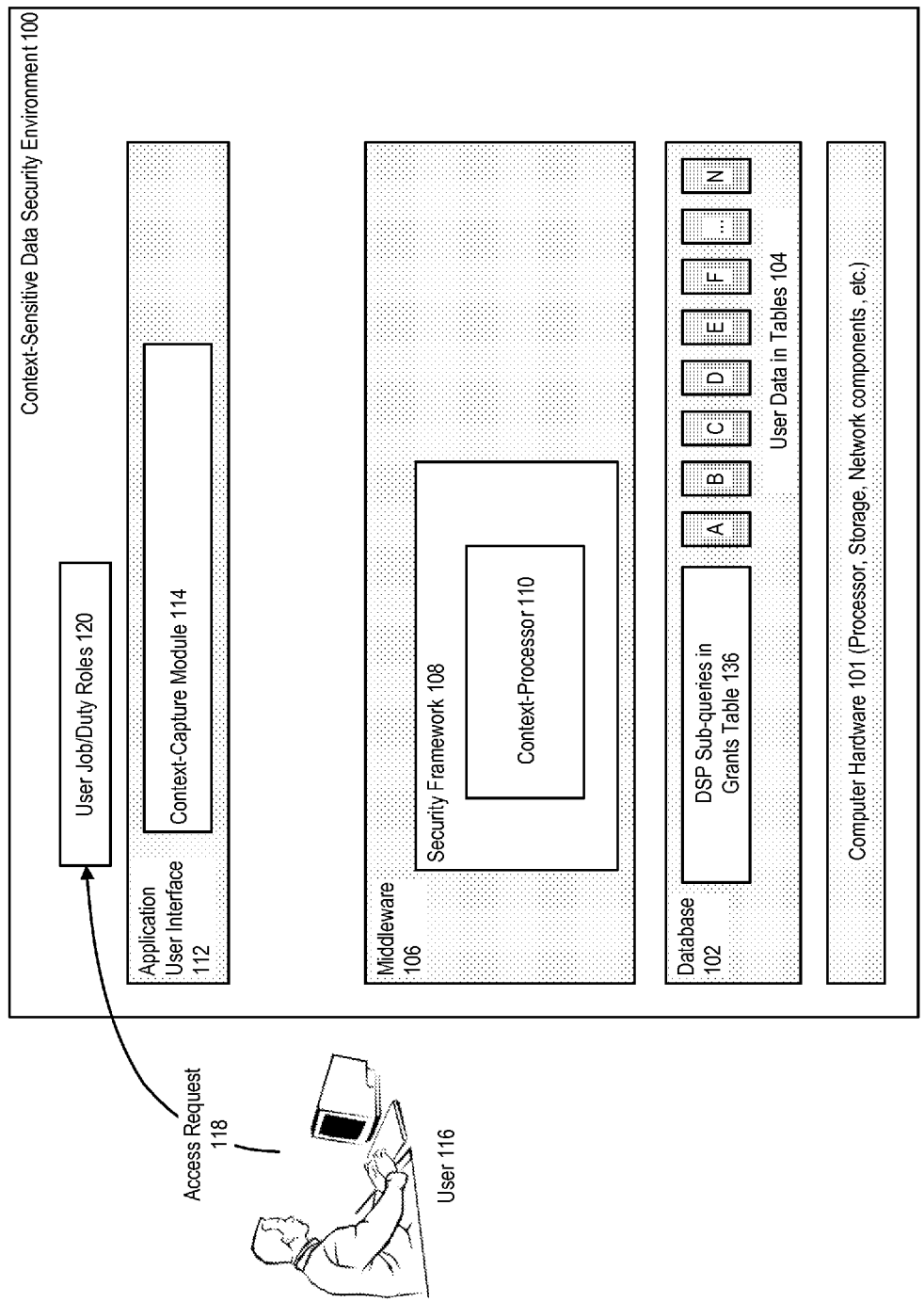
FIG. 4 illustrates a system for providing context-sensitive data security, including capturing and processing context to generate context-sensitive data security predicate sub-queries, in accordance with an embodiment.

FIG. 4 illustrates a system for providing context-sensitive data security, including capturing and processing context to generate context-sensitive data security predicate sub-queries, in accordance with an embodiment.

As shown in FIG. 4, in accordance with an embodiment, a context-sensitive data security environment 100 can include a computer hardware 101 (such as a processor, and storage components), a database 102 with user data stored in tables 104, and a middleware 106. A user 116 can make an access request 118 to a business application, for example to query or update information in the database as part of a business flow, wherein the user is associated with one or more job or duty roles 120. The role-based access request is received by a security framework 108 at the middleware, which determines appropriate DSPs stored in a central grants table 136 in the database.

As further shown in FIG. 4, in accordance with an embodiment, the context-sensitive data security environment also includes a context-capture module 114, which resides on the user interface layer 112 of the business application. The function of the context-capture module is to follow a logged-in user's actions and capture the context attributes up to the point where the user action starts the processing of their request to access data from the underlying relational database. These context attributes may be purely physical attributes such as geographic location, or may directly correspond to the user's desire to access a specific set of data based on the role and responsibilities being exercised for the particular use case.

In accordance with an embodiment, user-driven context attributes may be filter predicates that map to a table's columns in the underlying database, or they could be the user's desire to be acting in a certain job or duty role at that moment. Several application development frameworks provide a means of including such a context-capture module; for example, Oracle Application Development Framework (ADF) provides a Contextual Event Framework with appropriate listeners that can be used to capture binding attributes, actions and events from the user interface.

In accordance with an embodiment, the context-processor 110 resides in the middle tier of the business application or application server as part of the security framework 108. The context-processor takes two inputs: the context attributes captured from the user interface by the context-capture module; and the complete set of DSP sub-queries from the database that are applicable to the current user which are obtained through the RBAC security framework.

For example, consider the scenario where a user has been granted multiple roles that authorize data access from a variety of access paths. The user, while navigating the application, may decide that for that particular user interface flow, he/she would like to see data returned only for one specific role they are working on at the moment. In this situation, the context-processor can use this context attribute to parse the DSP sub-queries to identify which one of these corresponds to the user's desire to be in a particular role for that moment. After identifying the one DSP sub-query, the context-processor can strip out the remaining DSP sub-queries which are redundant to the user's request.

There may be situations where more than one context attribute would need to be processed. In these situations, in accordance with an embodiment, the context-processor can process all the captured context attributes to generate a context-sensitive SQL that is then processed in the normal way. The context-sensitive SQL thus generated has all the data security redundancies removed, and has additional predicates added to the DSP sub-queries. This action addresses the problem of SQL size and complexity and consequently the CBO's ability to generate optimized and stable execution plans, thereby resulting in better performance of the SQL. In short, the context-processor can be used to process the context attributes and apply these intelligently on the DSP sub-queries to produce context-sensitive SQLs.

Figure 5:
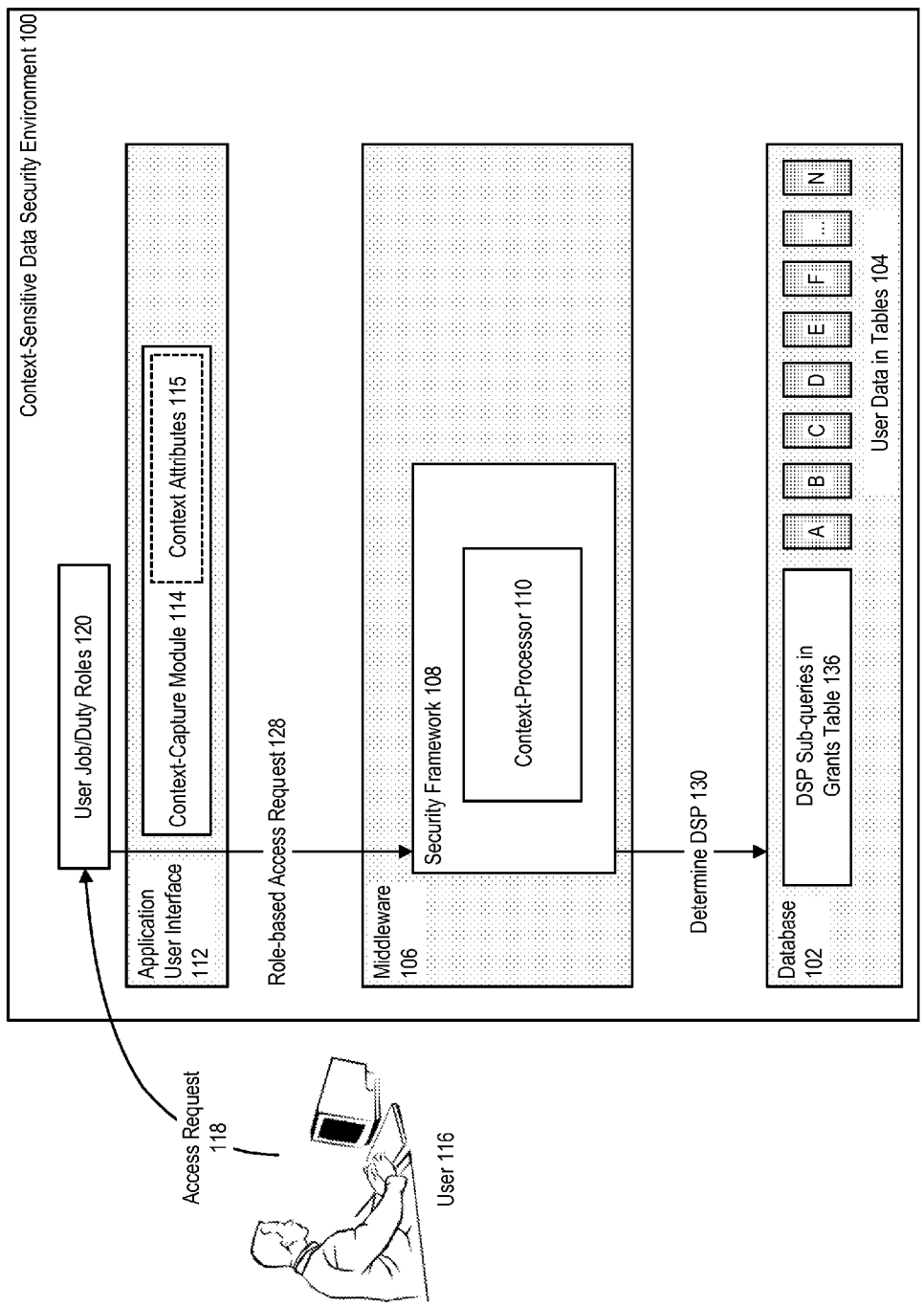
FIG. 5 further illustrates a system for providing context-sensitive data security, in accordance with an embodiment.

FIG. 5 further illustrates a system for providing context-sensitive data security, in accordance with an embodiment. As shown in FIG. 5, when the user interacts with the application user interface, the context-capture module captures context attributes 115, to be used in conjunction with a role-based access request 128, to determine appropriate DSPs 130.

Figure 6:
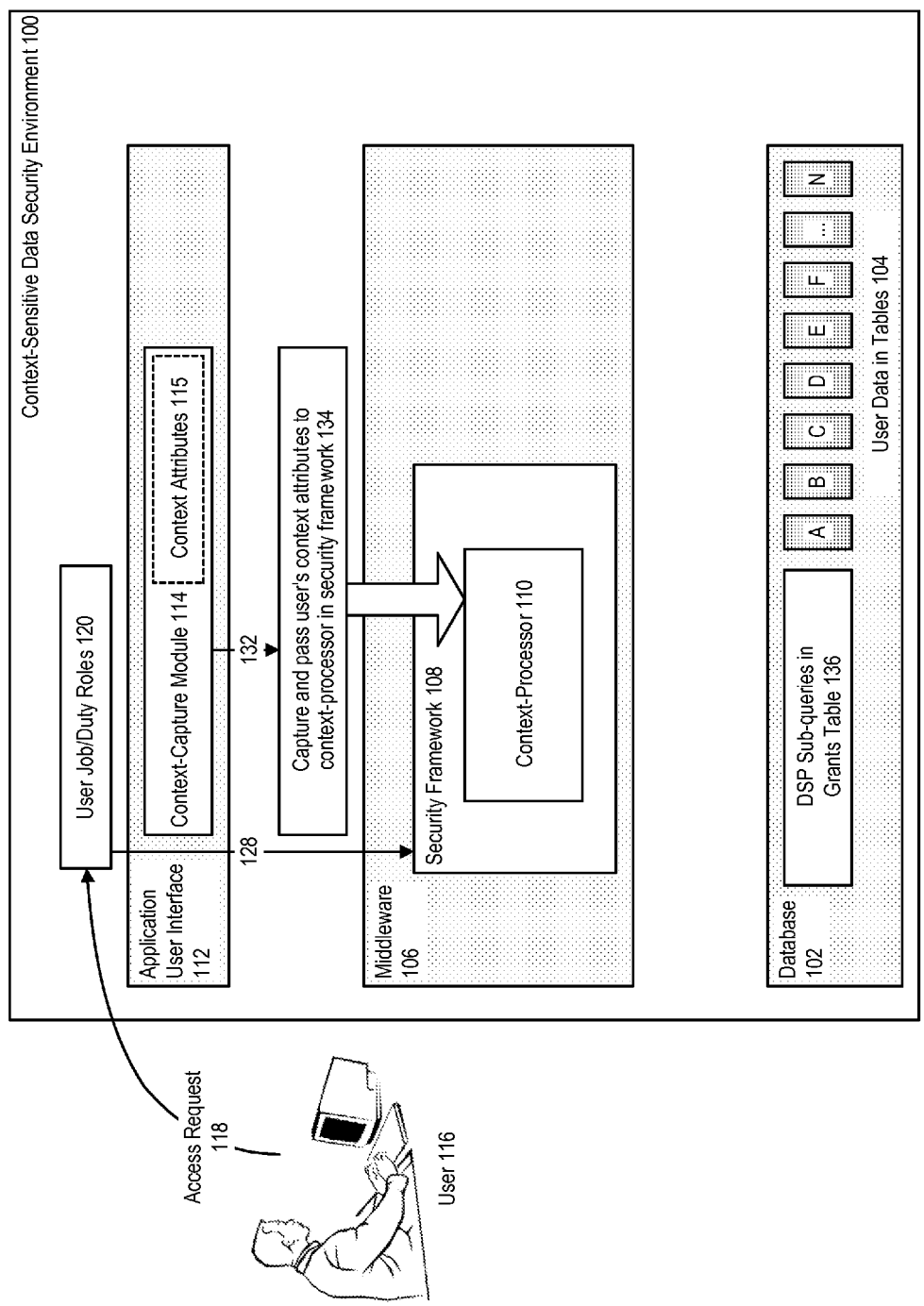
FIG. 6 further illustrates a system for providing context-sensitive data security, in accordance with an embodiment.

FIG. 6 further illustrates a system for providing context-sensitive data security, in accordance with an embodiment. As shown in FIG. 6, the context-capture module captures 132 and passes 134 the user's context attributes to the context-processor in the security framework.

Figure 7:
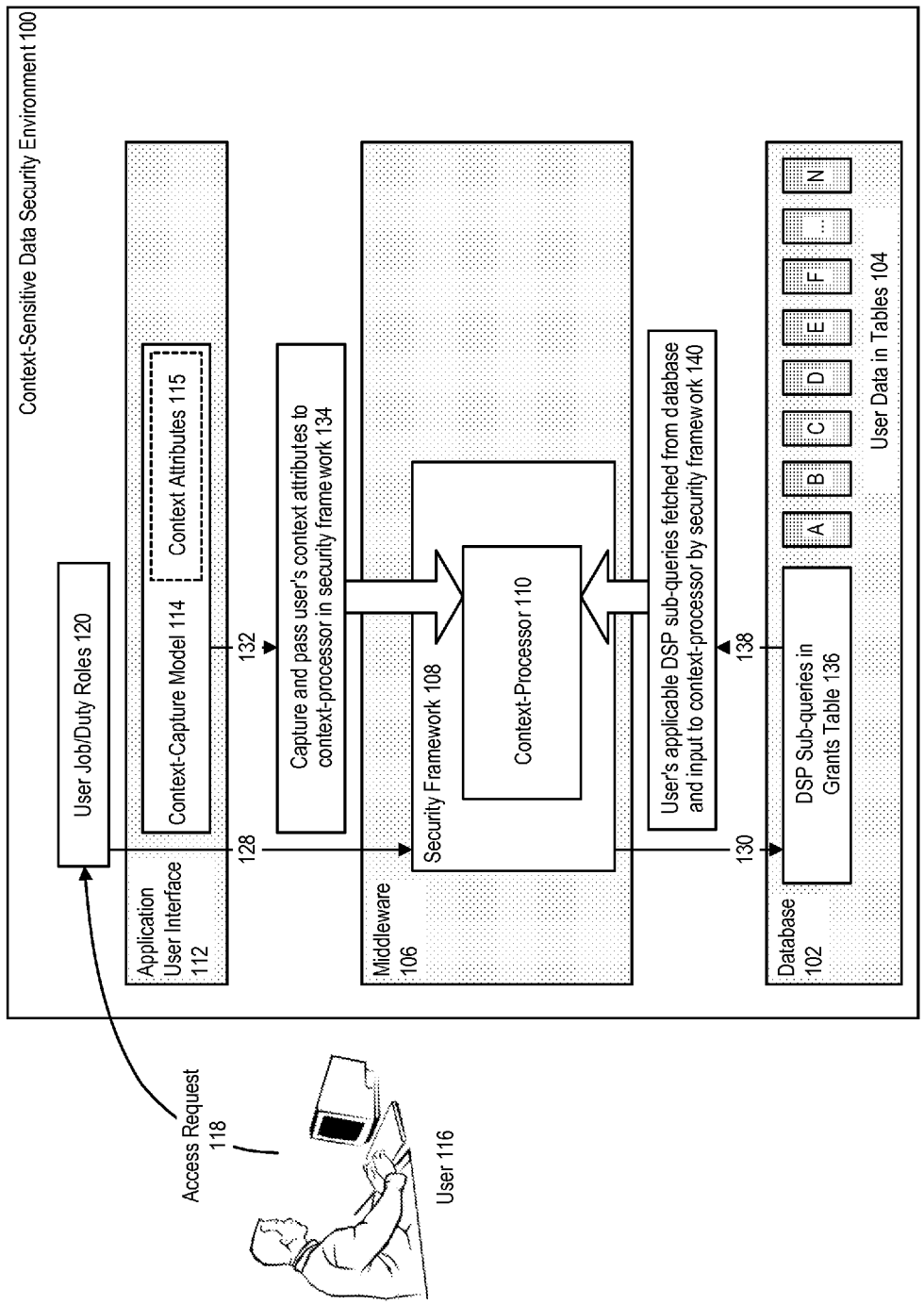
FIG. 7 further illustrates a system for providing context-sensitive data security, in accordance with an embodiment.

FIG. 7 further illustrates a system for providing context-sensitive data security, in accordance with an embodiment. As shown in FIG. 7, the user's applicable DSP sub-queries are fetched 138 from the database, and are input 140 to the context-processor by the security framework.

Figure 8:
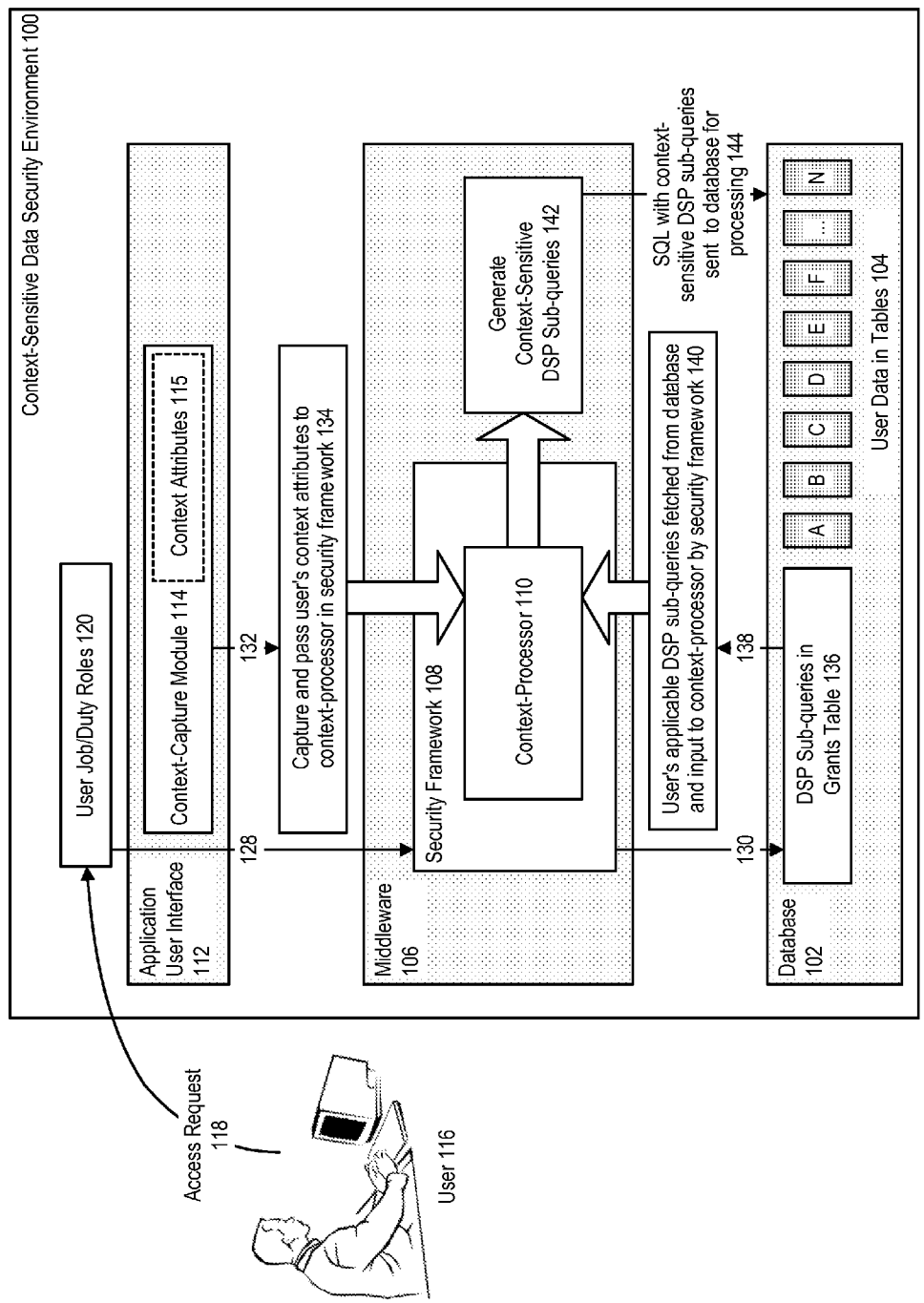
FIG. 8 further illustrates a system for providing context-sensitive data security, in accordance with an embodiment.

FIG. 8 further illustrates a system for providing context-sensitive data security, in accordance with an embodiment. As shown in FIG. 8, the context-processor uses the context-sensitive information provided by the context-capture module to generate context-sensitive DSP sub-queries 142, and generate or modify a SQL with the context-sensitive DSP sub-queries, thus simplifying the SQL being sent to the database for execution, and restricting the row-set processing to the current context. The query is then sent 144 to the database for processing.

Figure 9:
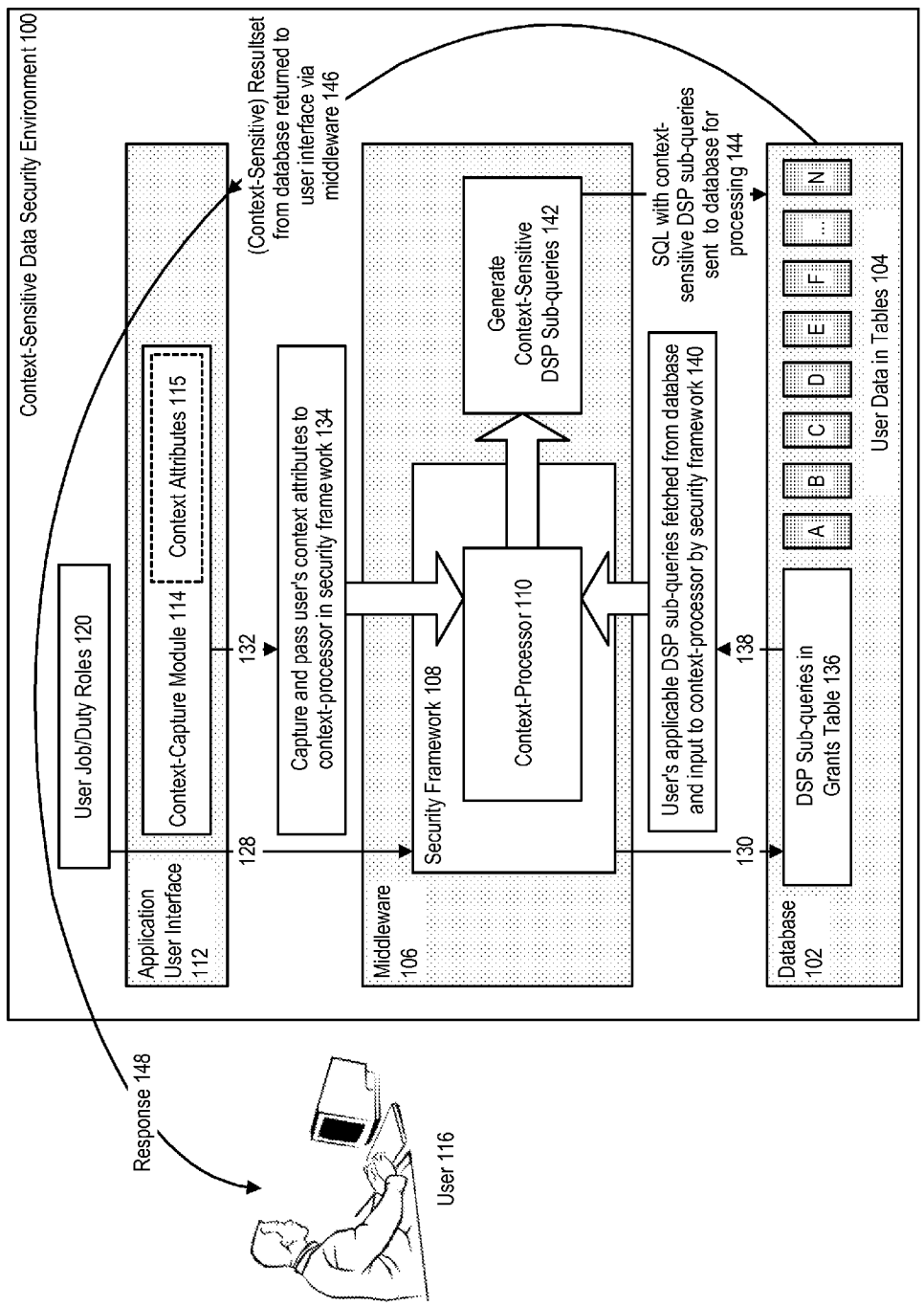
FIG. 9 further illustrates a system for providing context-sensitive data security, in accordance with an embodiment.

FIG. 9 further illustrates a system for providing context-sensitive data security, in accordance with an embodiment. As shown in FIG. 9, when the SQL with the context-sensitive DSP sub-queries has been processed against the database, a context-sensitive result (e.g., resultset) is returned 146 from the database to the user interface, where it can then be used to respond 148 to the user.

FIG. 10 illustrates an example of how a context-processor can be implemented using a generic algorithm, in accordance with an embodiment. As shown in FIG. 10, the final context-sensitive SQL 150 thus generated is simpler, smaller in size and has better performance when compared to the existing SQL.

Figure 11:
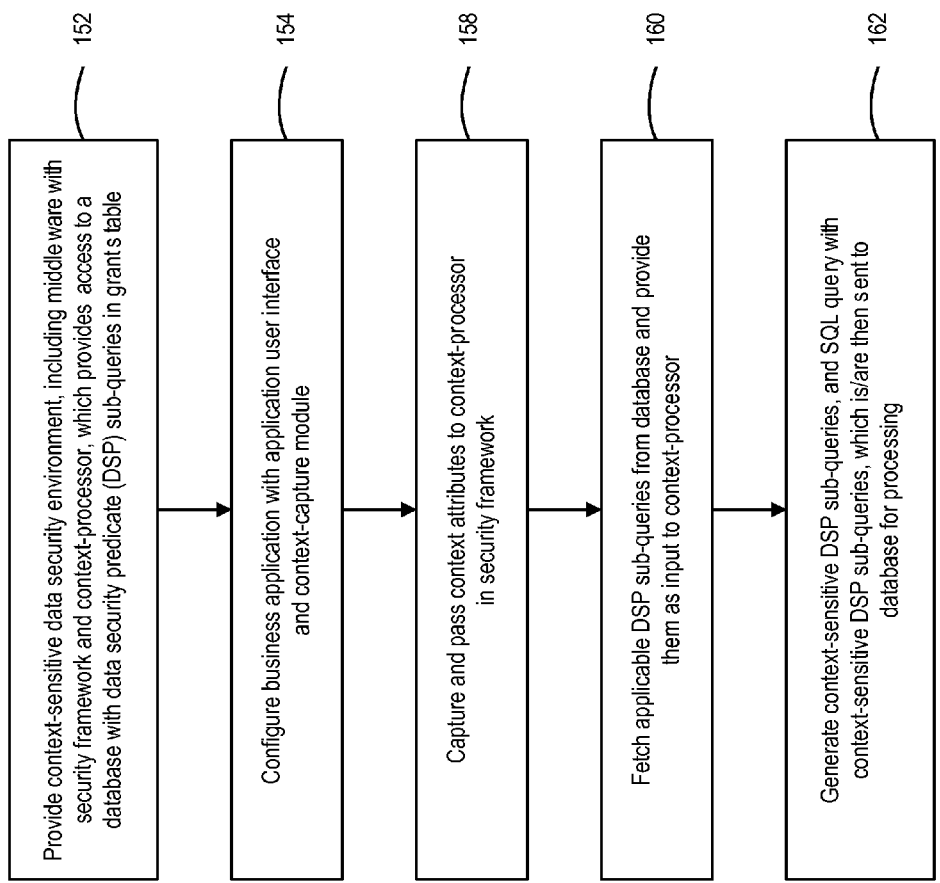
FIG. 11 is a flowchart of a method for providing context-sensitive data security, in accordance with an embodiment.

FIG. 11 is a flowchart of a method for providing context-sensitive data security, in accordance with an embodiment. As shown in FIG. 11, at step 152, a context-sensitive data security environment is provided, including middleware with a security framework and context-processor, which provides access to a database with data security predicate (DSP) sub-queries in a grants table.

At step 154, a business application is configured with an application user interface and a context-capture module.

At step 158, the system captures and passed context attributes to the context-processor in the security framework.

At step 160, applicable DSP sub-queries are fetched from the database and are provided as input to the context-processor.

At step 162, the context-processor generates context-sensitive DSP sub-queries, and a SQL query with the context-sensitive DSP sub-queries, which is/are then sent to the database for processing.

Figure 12:
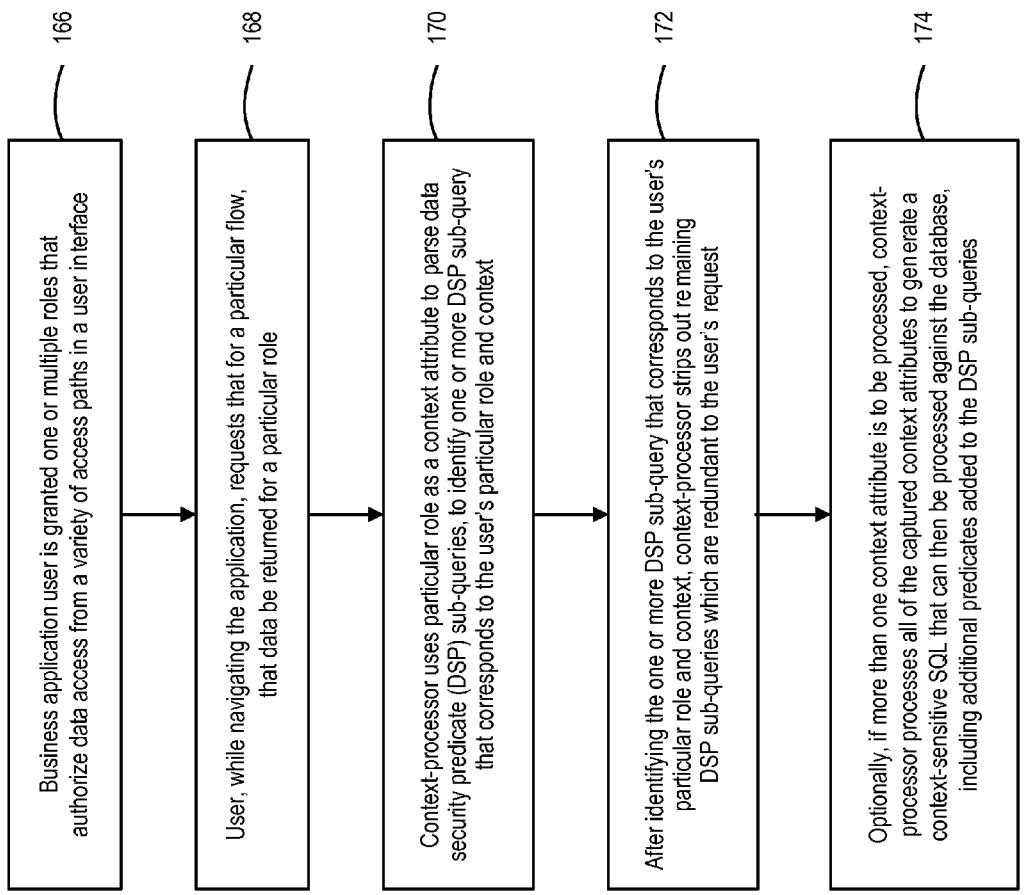
FIG. 12 is another flowchart of a method for providing context-sensitive data security, in accordance with an embodiment.

FIG. 12 is another flowchart of a method for providing context-sensitive data security, in accordance with an embodiment. As shown in FIG. 12, at step 166, a business application user is granted one or multiple roles that authorize data access from a variety of access paths in a user interface.

At step 168, the user can, while navigating the application, request that for a particular flow, data be returned for a particular role.

At step 170, the context-processor uses the particular role as a context attribute to parse DSP sub-queries, and to identify one or more DSP sub-query that corresponds to the user's particular role and context.

At step 172, after identifying the one or more DSP sub-query that corresponds to the user's particular role and context, the context-processor strips out remaining DSP sub-queries which are redundant to the user's request.

At step 174, optionally, if more than one context attribute is to be processed, the context-processor processes all of the captured context attributes, to generate a context-sensitive SQL that can then be processed against the database, including additional predicates added to the DSP sub-queries.

In accordance with an embodiment, the above techniques can be used with software products such as Oracle Fusion Applications together with an Oracle 11gR2 database, or other business application, middleware, and database software products.

In such environments, and using an approach as described above, considerable performance benefits can be seen, for example, in SQL response time, buffer gets, hard parse time, and shared memory utilization. Simplification of the DSP sub-queries can also improve the hard parse time of context-sensitive SQLs.

Illustrative Examples

By way of an example to illustrate the above, consider a situation in which one of the context attributes captured by the context-capture process and passed to the context-processor is the creation date of an object that relates to a column in a table in the database, and the user is interested in a row set that corresponds to a specific value or a range of values for creation date. The user may wish to see only the records that are directly owned by him/her, rather than all of the records to which the user has access to via the union all of their RBAC sub-queries.

In such a situation, in accordance with an embodiment, the context-processor can create context sensitive security by first, parsing all the DSP sub-queries to check where all this creation date is applicable and add it as an additional filter predicate to the affected DSP sub-queries; and then, based on the context, stripping out those DSP sub-queries that are not required but that are added by the RBAC security framework.

For example, FIG. 13 illustrates an example of such a "My Leads" query 180 prior to or without context processing; while FIG. 14 illustrates an example of a context-sensitive "My Leads" query after context processing 190, in accordance with an embodiment.

As shown in FIG. 14, in this example, the context-processor retains only the contextually applicable DSP sub-query, stripping out the remaining ones. In addition, the context predicate CREATION_DATE is added as an additional filter predicate to the retained DSP sub-query.

By way of further example, consider a situation in which a user has been granted multiple roles that authorize data access from a variety of access paths. The user, while navigating the application, may decide that for that particular user interface flow, he/she would like to see data returned only for one specific role they are working on at the moment.

In such a situation, in accordance with an embodiment, the context-processor can use this context attribute to parse the DSP sub-queries to identify which one of these corresponds to the user's desire to be in a particular role for that moment. After identifying that one DSP sub-query, the context-processor can strip out the remaining DSP sub-queries which are redundant to the user's request.

There may be situations where more than one context attribute would need to be processed. In these situations, in accordance with an embodiment, the context-processor can process all the captured context attributes to generate a context-sensitive SQL that can then be processed in the normal way. The context-sensitive SQL thus generated would have all the data security redundancies removed and would have additional predicates added to the DSP sub-queries. This action addresses the problem of SQL size and complexity, and consequently the CBO's ability to generate optimized and stable execution plans, thereby resulting in better performance of the SQL.

As described above, the importance of data security in enterprise business applications has risen sharply in recent years, particularly in view of newer regulations regarding data privacy, and the increased popularity of cloud-based environments. In accordance with various embodiments, the systems and methods described above can be used in such environments.

For example, in accordance with an embodiment, context attributes may be purely physical attributes such as geographic location, or may directly correspond to the user's desire to access a specific set of data based on the role and responsibilities being exercised for the particular use case. The use of physical attributes, such as a user or data location, may be important in some embodiments in the context of where the user is located and where the data is located that the user is trying to access. For example, due to privacy regulations in Europe, personal data residing in a database in Europe may not be intended to be accessed by users located in the United States of America. In accordance with an embodiment, such physical attributes can be taken into account and processed by the context-processor.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for context-sensitive data security for business application performance optimization, comprising:
   a computer including a processor;
   a context capture module that captures context attributes associated with a user interaction with a business application; and
   a context processor that receives as input the context attributes and a set of one or more data security predicate (DSP) sub-queries applicable to the user, and applies the context attributes to the DSP sub-queries to produce a context-sensitive query,
   wherein the context-sensitive query is a simplification of the set of one or more DSP sub-queries applicable to the user,
   wherein the simplification results from the application of the context attributes to the DSP sub-queries; and
   a security framework that determines, based on the user's role and a current context, the set of DSP sub-queries applicable to the user, and provides the set of DSP sub-queries to the context processor in response to the user interaction.

2. The system of claim 1, wherein wherein the context capture module captures context attributes associated with the user interacting with an application user interface as part of a business flow.

3. The system of claim 1, wherein the context-sensitive query is communicated to a database as a query that includes context-sensitive DSP sub-queries.

4. The system of claim 3, wherein the context-sensitive query is a structured query language (SQL) query which includes the context-sensitive DSP sub-queries, and which is communicated to the database to generate a response to the user interaction.

5. The system of claim 1, wherein the system is used within an environment that includes the business application, or a cloud-based or other type of computing environment.

6. The system of claim 1, wherein the context-sensitive query is produced by using the context attributes to filter a row-set that results from a union of the one or more DSP sub-queries applicable to the user.

7. A method for context-sensitive data security for business application performance optimization, comprising:
   providing a context capture module that captures context attributes associated with a user interaction with a business application; and
   providing a context processor that receives as input the context attributes and a set of one or more data security predicate (DSP) sub-queries applicable to the user, and applies the context attributes to the DSP sub-queries to produce a context-sensitive query,
   wherein the context-sensitive query is a simplification of the set of one or more DSP sub-queries applicable to the user,
   wherein the simplification results from the application of the context attributes to the DSP sub-queries; and
   wherein a security framework determines, based on the user's role and a current context, the set of DSP sub-queries applicable to the user, and provides the set of DSP sub-queries to the context processor in response to the user interaction.

8. The method of claim 7, wherein the context capture module captures context attributes associated with the user interacting with an application user interface as part of a business flow.

9. The method of claim 7, wherein the context-sensitive query is communicated to a database as a query that includes context-sensitive DSP sub-queries.

10. The method of claim 9, wherein the context-sensitive query is a structured query language (SQL) query which includes the context-sensitive DSP sub-queries, and which is communicated to the database to generate a response to the user interaction.

11. The method of claim 7, wherein the method is used within an environment that includes the business application, or a cloud-based or other type of computing environment.

12. The method of claim 7, wherein the context-sensitive query is produced by using the context attributes to filter a row-set that results from a union of the one or more DSP sub-queries applicable to the user.

13. A non-transitory computer readable storage medium, including instructions stored thereon which when read and executed by one or more computers cause the one or more computers to perform the steps comprising:
   providing a context capture module that captures context attributes associated with a user interaction with a business application; and
   providing a context processor that receives as input the context attributes and a set of one or more data security predicate (DSP) sub-queries applicable to the user, and applies the context attributes to the DSP sub-queries to produce a context-sensitive query,
   wherein the context-sensitive query is a simplification of the set of one or more DSP sub-queries applicable to the user,
   wherein the simplification results from the application of the context attributes to the DSP sub-queries; and
   wherein a security framework determines, based on the user's role and a current context, the set of DSP sub-queries applicable to the user, and provides the set of DSP sub-queries to the context processor in response to the user interaction.

14. The non-transitory computer readable storage medium of claim 13, wherein the context capture module captures context attributes associated with the user interacting with an application user interface as part of a business flow.

15. The non-transitory computer readable storage medium of claim 13, wherein the context-sensitive query is communicated to a database as a query that includes context-sensitive DSP sub-queries.

16. The non-transitory computer readable storage medium of claim 15, wherein the context-sensitive query is a structured query language (SQL) query which includes the context-sensitive DSP sub-queries, and which is communicated to the database to generate a response to the user interaction.

17. The non-transitory computer readable storage medium of claim 13, wherein the steps are performed within an environment that includes the business application, or a cloud-based or other type of computing environment.

\* \* \* \* \*

UNITED STATES PATENT AND TRADEMARK OFFICE
CERTIFICATE OF CORRECTION

PATENT NO. : 9,235,723 B2  
APPLICATION NO. : 13/944529  
DATED : January 12, 2016  
INVENTOR(S) : Sirohi Page 1 of 1

It is certified that error appears in the above-identified patent and that said Letters Patent is hereby corrected as shown below:

On the title page column 2, under other publications, line 2, delete "Control-Rrequently" and insert -- Control-Frequently --, therefor.

On the title page column 2, under other publications, line 8, delete "Unkown" and insert -- Unknown --, therefor.

In the claims,

In column 9, line 41, in claim 2, delete "wherein wherein" and insert -- wherein --, therefor.

Signed and Sealed this  
Twenty-third Day of August, 2016

Michelle K. Lee  
*Director of the United States Patent and Trademark Office*